United States Patent
Fukuda (10) Patent No.: US 6,577,322 B1
(45) Date of Patent: Jun. 10, 2003

(54) METHOD AND APPARATUS FOR CONVERTING VIDEO SIGNAL RESOLUTION

(75) Inventor: Takatoshi Fukuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 314 days.

(21) Appl. No.: 09/610,694

(22) Filed: Jul. 5, 2000

(30) Foreign Application Priority Data

Nov. 11, 1999 (JP) .......................................... 11-321222

(51) Int. Cl.$^7$ ................................................. G09G 5/00
(52) U.S. Cl. ....................... 345/698; 345/699; 345/204; 348/521; 348/543; 348/542
(58) Field of Search ................................ 345/698, 699, 345/204; 348/542, 540, 521

(56) References Cited

U.S. PATENT DOCUMENTS

| 5,874,937 A | * | 2/1999 | Kesatoshi | ..................... 345/428 |
| 6,130,721 A | * | 10/2000 | Yoo et al. | .................... 348/558 |
| 6,295,048 B1 | * | 9/2001 | Ward et al. | .................. 345/785 |
| 6,392,642 B1 | * | 5/2002 | Wu | ............................. 345/213 |

FOREIGN PATENT DOCUMENTS

| JP | 7-295513 | 11/1995 |
| JP | 9-281926 | 10/1997 |

* cited by examiner

Primary Examiner—Amare Mengistu
Assistant Examiner—Jimmy H. Nguyen
(74) Attorney, Agent, or Firm—Staas & Halsey LLP (57) ABSTRACT

A method and apparatus for converting a digital video signal, to a signal having a resolution that matches a display device, by using simple hardware alone. When a digital video signal is input together with a data enable (DE) signal and a dot clock (DCLK) signal, the number of clocks of the DCLK signal generated during an active period of the DE signal is counted and, based on the thus counted number of clocks, the resolution of the input video image is identified; then, based on the resolution thus identified, the pixel density of the input video signal is converted so as to form a video signal having a resolution that matches the display device. Alternatively, the resolution of the input video signal may be identified by counting the number of pulses of the DE signal generated during one vertical synchronization period.

2 Claims, 7 Drawing Sheets

METHOD AND APPARATUS FOR CONVERTING VIDEO SIGNAL RESOLUTION

BACKGROUND OF THE INVENTION

1. Field of the Invention

The present invention relates to a method and apparatus for converting a digital video signal output from a personal computer or the like into a signal having a resolution that matches a display device.

2. Description of the Related Art

The resolution of an LCD (liquid crystal display) panel is physically fixed; for example, in the case of a panel designed for VGA (Video Graphics Array) which is one of the video display standards, since the screen is formed in a matrix of 640 pixels horizontally and 480 pixels vertically, a correct image cannot be displayed unless a video signal consisting of 640×480 pixel data per screen is supplied by synchronizing its timing with horizontal and vertical sync signals. In the case of an XGA (Extended Graphics Array) panel, the matrix size is 1024×768 pixels.

If the number of pixels in an image to be displayed on such a display panel of fixed pixel arrangement is different from the number of pixels of the panel, the pixel density of the input image data must be converted to match that of the panel before presenting the data to the panel for display. For example, when transmitting VGA video data for display on an XGA panel, the pixel density must be scaled up by a factor of 1.6 in both horizontal and vertical directions.

The simplest method of pixel density conversion will be described by taking a scaling in the horizontal direction as an example. When converting VGA data to XGA data, for example, eight pixel data should be generated from five pixel data because the pixel density must be scaled up by a factor of 1.6. More specifically, an input data sequence of $D_1, D_2, D_3, D_4, D_5, D_6$, and so on is converted, for example, into an output data sequence of $D_1, D_1, D_2, D_2, D_3, D_4, D_4, D_5, D_6, D_6$, and so on by duplicating three of the five pixel data.

When the resolution of the input video data is unknown, the resolution must be identified before converting the pixel density. In a prior art method which converts an analog RGB video signal into digital form for display on a display device such as an LCD panel, a microcomputer or the like examines the kind, or the resolution, of the video signal based on the horizontal and vertical sync signals accompanying the video signal, and controls a pixel density conversion circuit to convert the resolution of the video signal to the resolution that best matches the display device.

Figure 7:
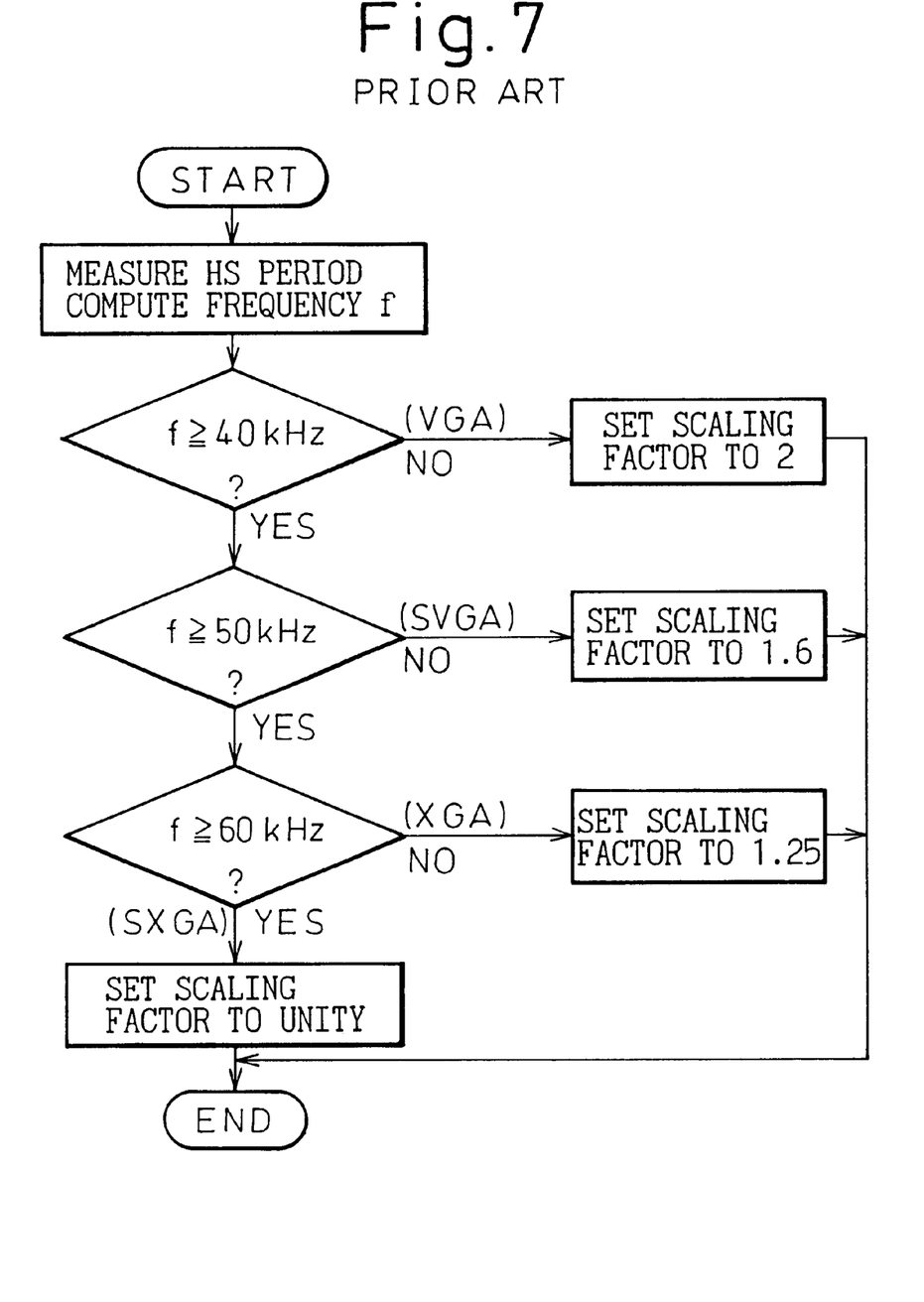
FIG. 7 is a flowchart illustrating the sequence of processing performed in a microcomputer which performs resolution conversion at an analog interface.

FIG. 7 is a flowchart illustrating the sequence of processing performed in a microcomputer which performs resolution conversion at an analog interface. The illustrated example assumes the case where an image is displayed on an SXGA (Super XGA) LCD panel designed for a resolution of 1280×1024 pixels. As shown in the flowchart, the microcomputer first measures the period of the input horizontal sync signal (HS) and computes its frequency f from that period.

If f<40 kHz, it is determined that the input display mode is VGA mode (640×480 pixels), and the pixel density scaling factor is set to two. If 40 kHz$\leq$f<50 kHz, it is determined that the input display mode is SVGA (Super VGA) mode (800×600 pixels), and the pixel density scaling factor is set to 1.6. If 50 kHz$\leq$f<60 kHz, it is determined that the input display mode is XGA mode (1024×768 pixels), and the pixel density scaling factor is set to 1.25. Further, if 60 kHz$\leq$f, it is determined that the input display mode is the intended SXGA mode (1280×1024 pixels), and the pixel density scaling factor is set to unity.

The frequencies used as thresholds in the above processing are only illustrative. VGA alone uses a variety of horizontal sync frequencies and, since a large amount of resources is required if the resolution is to be identified by only using hardware, a microcomputer must be used as described above. However, it is difficult to accurately identify the frequency of the sync signal by using a microcomputer, and there arises the possibility that optimum resolution conversion may not be achieved. Furthermore, not only is it required to provide a microcomputer as an external device, but the firmware for it has to be developed.

SUMMARY OF THE INVENTION

In view of the above problems and the recent trend toward digital interfaces for video signals, it is an object of the present invention is to provide a method and apparatus for converting a digital video signal to a signal having a resolution that matches a display device by only using simple hardware and by eliminating the need to develop firmware.

In the present invention, a digital video signal interface handles a data enable signal and a dot clock signal in addition to the horizontal and vertical sync signals as handled by prior art analog interfaces and, to achieve the above object, the invention employs the technical configuration described hereinafter by noting that there exists a predefined relationship between the data enable and dot clock signals.

More specifically, according to the present invention, there is provided a method for converting the resolution of a digital video signal that is input together with a data enable signal and a dot clock signal, comprising the steps of: counting the number of clocks of the dot clock signal generated during an active period of the data enable signal; identifying the resolution of the input video signal based on the number of clocks thus counted; and converting, based on the identified resolution, the pixel density of the input video signal so as to form a video signal having a resolution that matches a display device.

According to the present invention, there is also provided a method for converting the resolution of a digital video signal that is input together with a data enable signal and a dot clock signal, comprising the steps of: counting the number of pulses of the data enable signal generated during one vertical synchronization period; identifying the resolution of the input video signal based on the number of pulses thus counted; and converting, based on the identified resolution, the pixel density of the input video signal so as to form a video signal having a resolution that matches a display device.

The method of the present invention further comprises the step of identifying the one vertical synchronization period based on the number of clocks of the dot clock signal generated during an inactive period of the data enable signal.

According to the present invention, there is also provided an apparatus for converting the resolution of a digital video signal that is input together with a data enable signal and a dot clock signal, comprising: count means for counting the number of clocks of the dot clock signal generated during an active period of the data enable signal; identifying means for identifying the resolution of the input video signal based on the number of clocks counted by the count means; and pixel density converting means for converting, based on the resolution identified by the identifying means, the pixel density of the input video signal so as to form a video signal having a resolution that matches a display device.

According to the present invention, there is also provided an apparatus for converting the resolution of a digital video signal that is input together with a data enable signal and a dot clock signal, comprising: count means for counting the number of pulses of the data enable signal generated during one vertical synchronization period; identifying means for identifying the resolution of the input video signal based on the number of pulses counted by the count means; and pixel density converting means for converting, based on the resolution identified by the identifying means, the pixel density of the input video signal so as to form a video signal having a resolution that matches a display device.

The apparatus of the present invention further comprises means for identifying the one vertical synchronization period based on the number of clocks of the dot clock signal generated during an inactive period of the data enable signal.

BRIEF DESCRIPTION OF THE DRAWINGS

Further features and advantages of the present invention will be apparent from the following description with reference to the accompanying drawings, in which.

DESCRIPTION OF THE PREFERRED EMBODIMENTS

Embodiments of the present invention will be described below with reference to the accompanying drawings.

Figure 1:
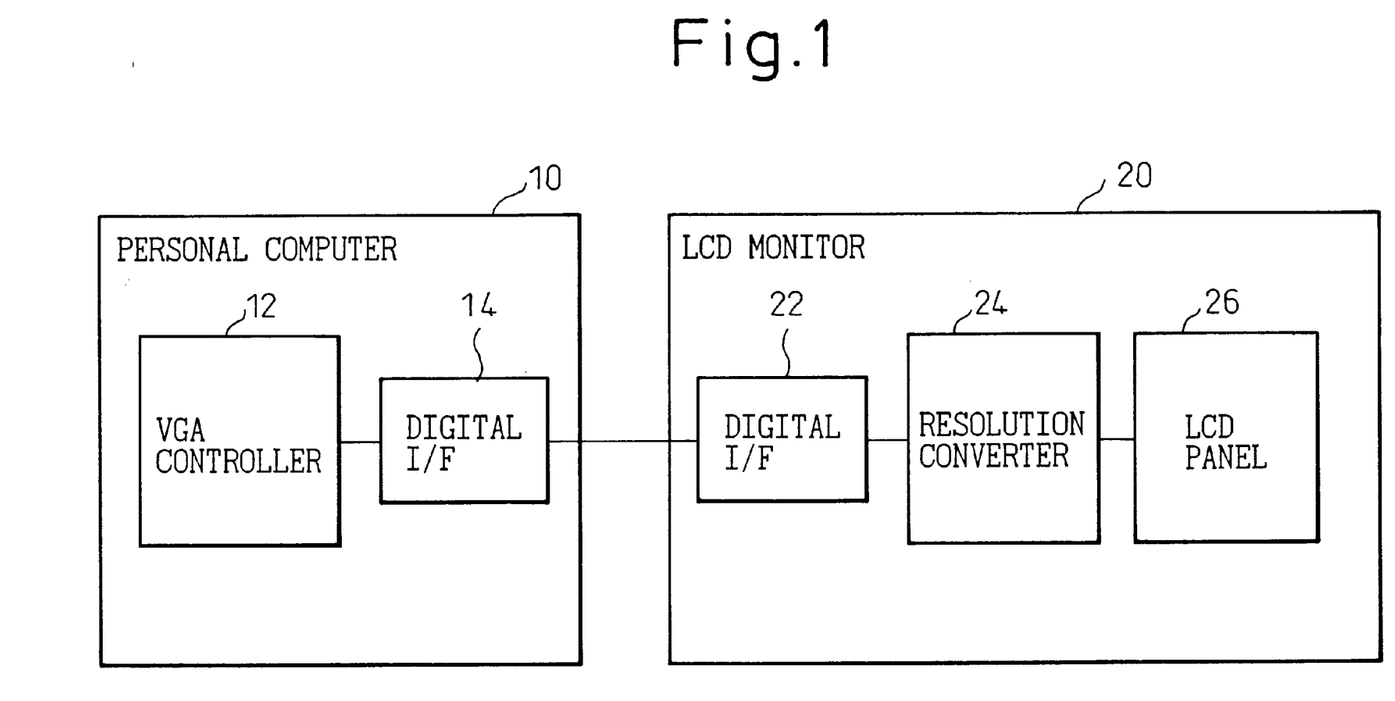
FIG. 1 is a block diagram showing one example of a system configuration to which the resolution conversion method and apparatus of the present invention are applied.

FIG. 1 is a block diagram showing one example of a system configuration to which the resolution conversion method and apparatus of the invention are applied. A personal computer 10 includes a VGA controller 12 which generates video data conforming to the VGA standard, a video display standard, and a digital interface 14 for transmitting the video signal to an external device. On the other hand, an LCD monitor 20 includes a digital interface 22, an LCD panel 26, and a resolution converter 24 interposed therebetween.

The digital interface interfacing between the personal computer 10 and the LCD monitor 20 handles a set of RGB signals and a horizontal sync signal (HS) and a vertical sync signal (VS) as control signals, as with analog interfaces; for the digital interface, however, a data enable (DE) signal and a dot clock (DCLK) signal are newly added. These two additional signals are originally intended to control the LCD panel, but in the present invention, these are used to identify the resolution mode of the input video signal.

Figure 2:
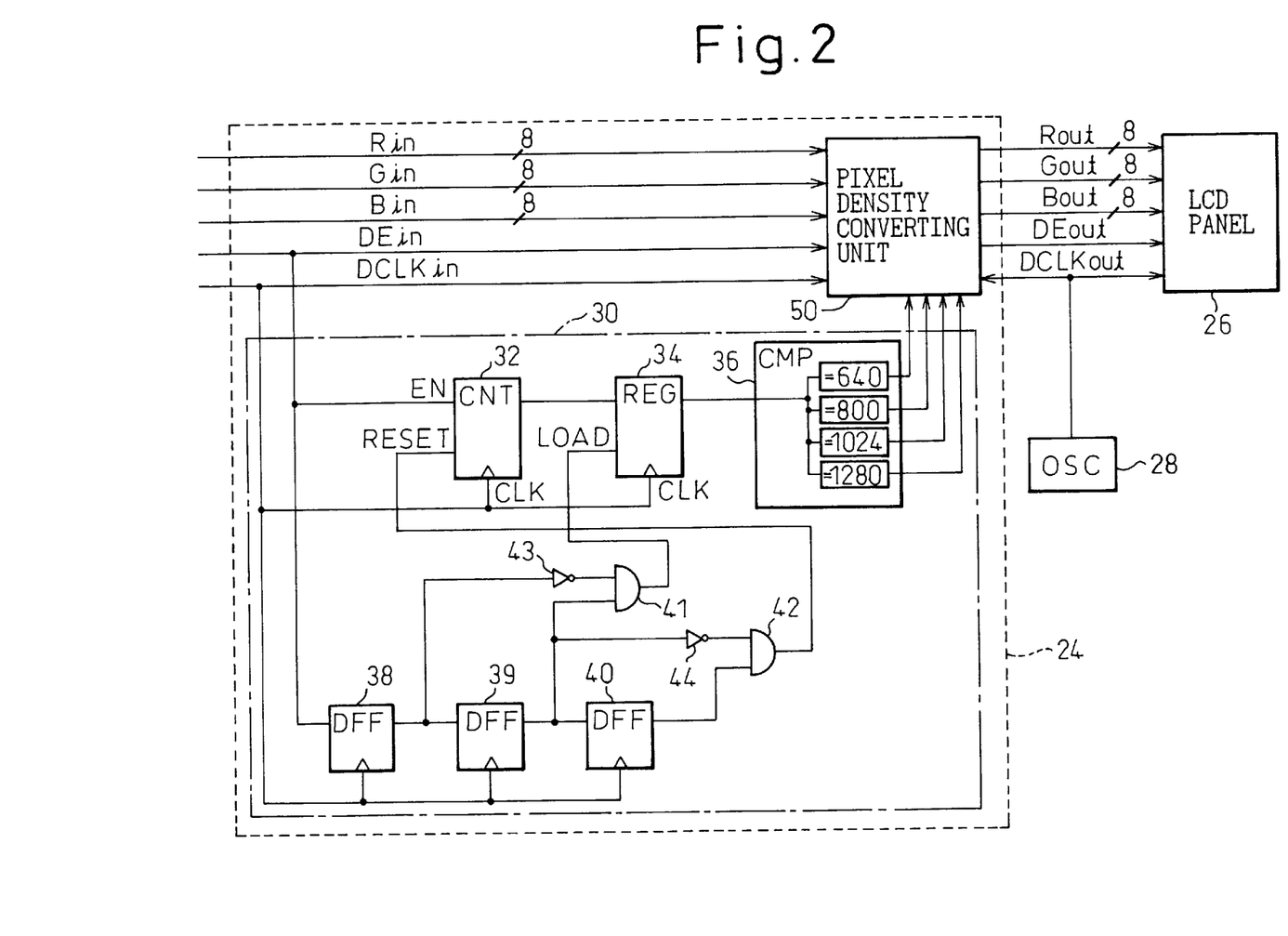
FIG. 2 is a diagram showing the circuit configuration of a resolution converter according to one embodiment of the present invention.

FIG. 2 is a circuit diagram showing the circuit configuration of a resolution converter 24 according to one embodiment of the present invention. This embodiment assumes the use of an SVGA (1280×1024 pixels) LCD panel as the LCD panel 26 connected after the resolution converter 24. The resolution converter 24 includes an input resolution identifying unit 30 and a pixel density converting unit 50. An oscillator 28 is provided to generate an output dot clock for the LCD panel 26 and the pixel density converting unit 50.

The input resolution identifying unit 30 is a circuit that identifies the resolution of the input video signal on the basis of the data enable (DE) signal and dot clock (DCLK) signal input together with the digital video signal. The input resolution identifying unit 30 includes a counter 32, a register 34, and a comparator 36. The counter 32 counts the number of clocks of the DCLK signal during an active period of the DE signal. The register 34 stores the final count result of the counter 32. The comparator 36 compares the output of the register 34 with four reference values 640, 800, 1024, and 1280.

The input resolution identifying unit 30 further includes three D-type flip-flops 38, 39, and 40, AND gates 41 and 42, and inverters 43 and 44. The flip-flops, AND gates, and inverters create from the DE signal and DCLK signal a load (LOAD) signal for the register 34 and a reset (RESET) signal for the counter 32.

The operation of the input resolution identifying unit 30 will be described with reference to the timing chart of FIGS. 3A to 3I. The number of clocks of the DCLK signal generated during an active period of the DE signal is uniquely determined by the resolution mode, that is, 640 for VGA mode, 800 for SVGA mode, 1024 for XGA mode, and 1280 for SXGA mode. Accordingly, the resolution of the input video signal can be identified by obtaining the number of clocks of the DCLK signal during that period.

Figure 3A:
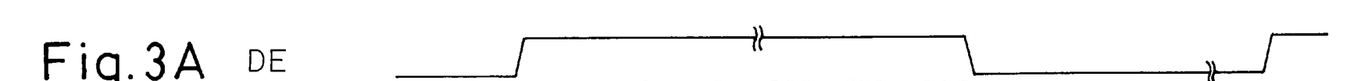
FIGS. 3A, 3B, 3C, 3D, 3E, 3F, 3G, 3H, and 3I are a timing chart for explaining the operation of an input resolution identifying unit shown in FIG. 2.
Figure 3B:
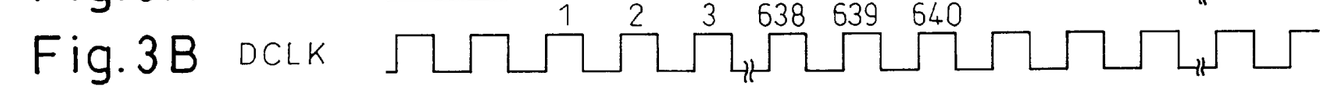
Figure 3C:
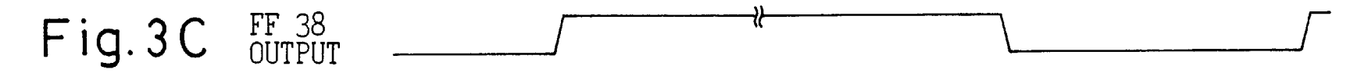
Figure 3D:
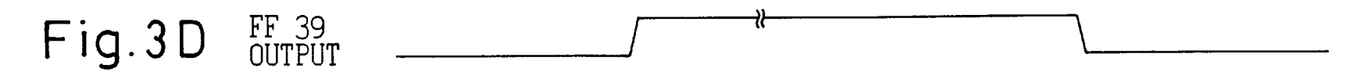
Figure 3E:
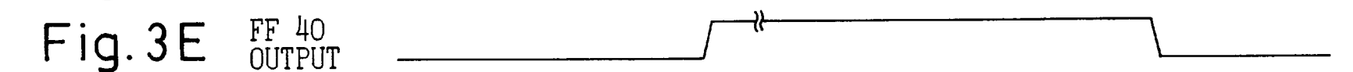
Figure 3F:
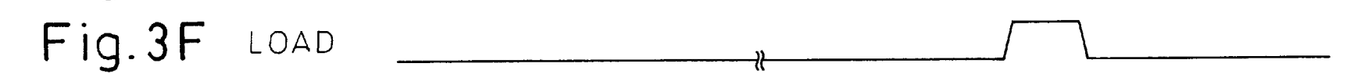

In the VGA mode, for example, the DE signal and the DCLK signal have the relationship shown in FIGS. 3A and 3B. Based on the DE signal and the DCLK signal, the outputs of the three D-type flip-flops 38, 39, and 40 form the stages shown in FIGS. 3C, 3D, and 3E, respectively. The LOAD signal for the register 34 and the RESET signal for the counter 32, generated using the inverters 43 and 44 and AND gates 41 and 42 based on the outputs of the flip-flops, are as shown in FIGS. 3F and 3G, respectively.

Figure 3G:
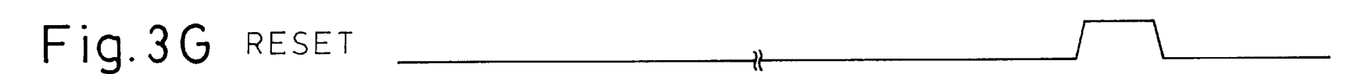
Figure 3H:
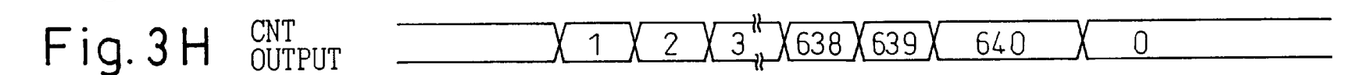
Figure 3I:
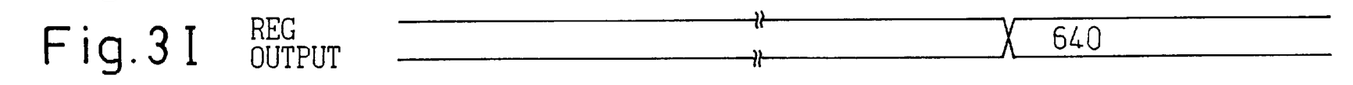

The counter 32 accepts the DE signal at its enable terminal, the DCLK signal at its clock terminal, and the RESET signal of FIG. 3G at its reset terminal, so that the output of the counter 32 changes as shown in FIG. 3H. Since the output of the counter 32 is latched into the register 34 at the timing of the LOAD signal of FIG. 3F, the output of the register 34 changes as shown in FIG. 3I. The comparator 36 in FIG. 2 compares the output of the register 34 with the four reference values 640, 800, 1024, and 1280 and, based on the result of the comparison, sets one of its four output signal lines active.

The pixel density converting unit 50 in FIG. 2 converts the pixel density in accordance with the output of the comparator 36. More specifically, since the LCD panel of the present embodiment is an SXGA panel (1280×1024 pixels), the pixel density converting unit 50 sets the scaling factor to two if the input display mode is VGA mode (640×480 pixels), to 1.6 if the mode is SVGA mode (800×600 pixels), to 1.25 if the mode is XGA mode (1024×768 pixels), and to unity if the mode is SXGA mode (1280×1024 pixels).

In operation, when VGA data is input, for example, the pixel density converting unit 50 creates 10 pixel data from five pixel data because the pixel density must be doubled. That is, an input data sequence of $D_1$, $D_2$, $D_3$, $D_4$, and so on is converted into a data sequence of $D_1$, $D_1$, $D_2$, $D_2$, $D_3$, $D_3$, $D_4$, $D_4$, and so on by duplicating each pixel data.

Figure 4:
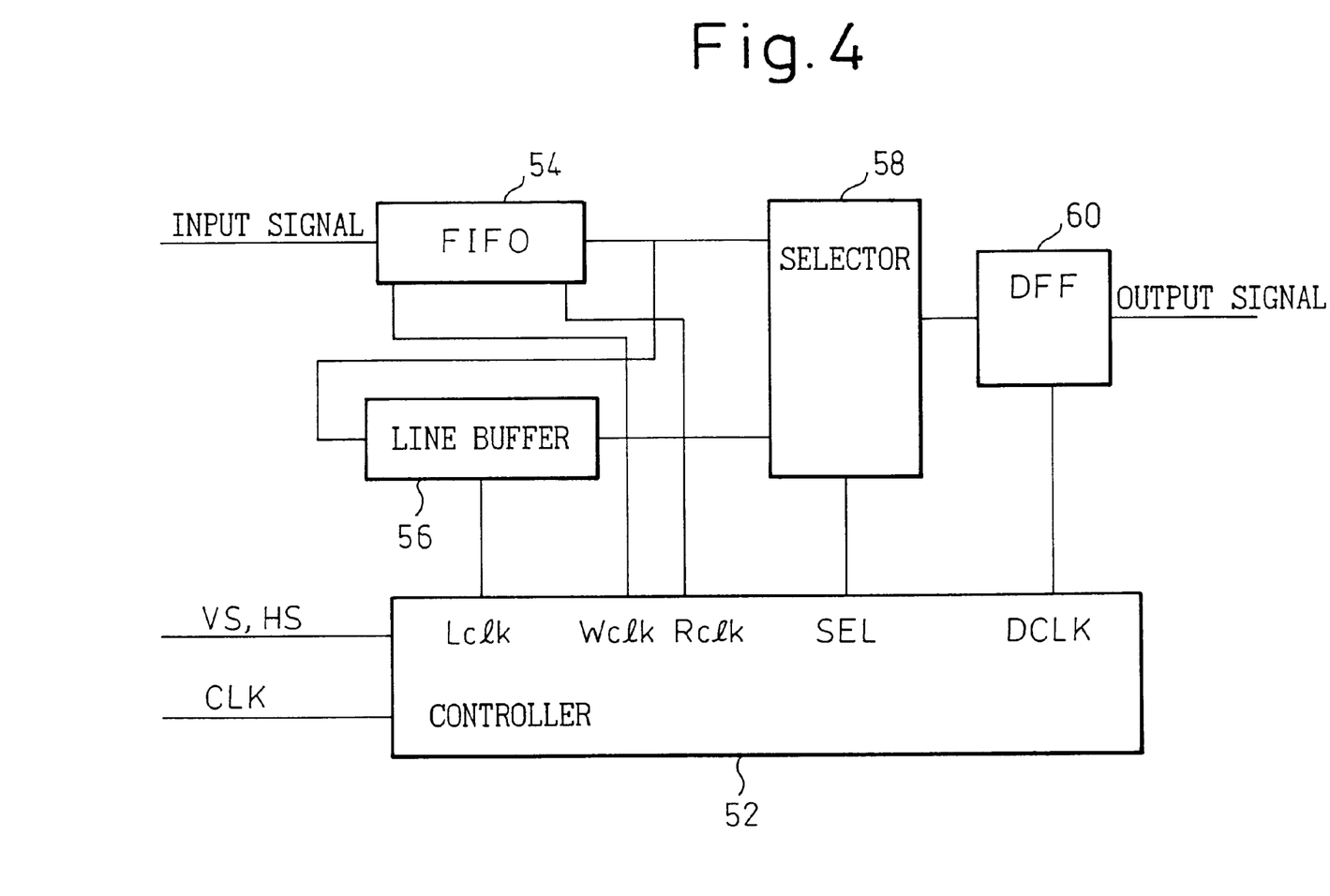
FIG. 4 is a block diagram showing one example of the circuit configuration of a pixel density conversion unit shown in FIG. 2.

FIG. 4 is a block diagram showing an example of the circuit configuration of the pixel density converting unit 50 that operates in the above manner. First, the input video signal is latched into a FIFO (First In First Out) buffer 54 by Wclk (clock signal) input from a controller 52. The data latched into the FIFO buffer 54 is read out by Rclk (clock signal) input from the controller 52 and fed to a line buffer 56 and a selector 58. The selector 58 selects either the output of the FIFO buffer 54 or the output of the line buffer 56 and supplies the selected one to a D-type flip-flop 60. The output of the flip-flop 60 provides the output of the pixel density converting unit 50. The pixel density conversion is accomplished by the controller 52 controlling the FIFO buffer 54, line buffer 56, selector 58, and flip-flop 60.

Figure 5:
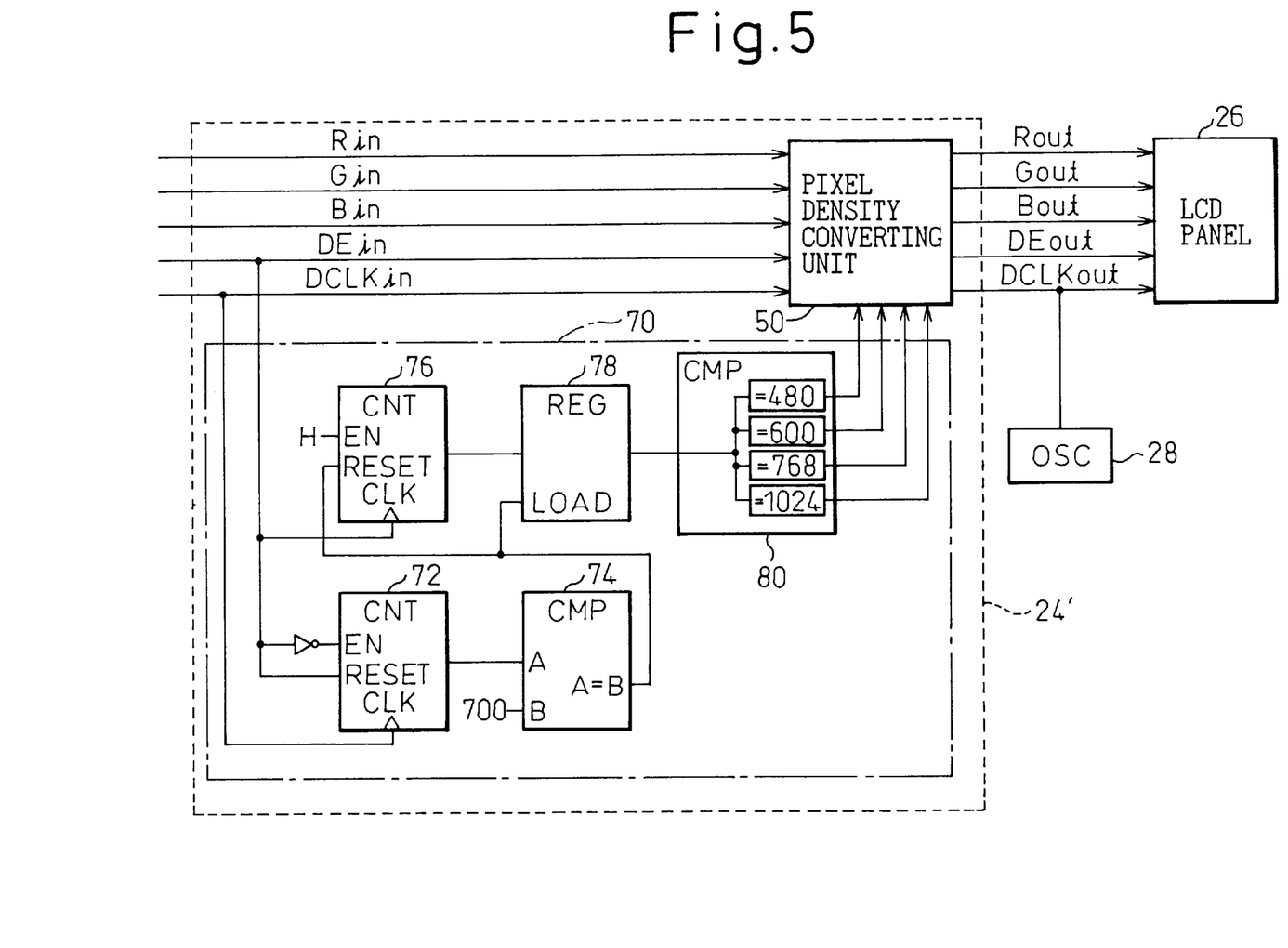
FIG. 5 is a diagram showing the circuit configuration of a resolution converter according to another embodiment of the present invention.

FIG. 5 is a diagram showing the circuit configuration of a resolution converter according to another embodiment. The resolution converter 24' shown in FIG. 5 differs from the resolution converter 24 shown in FIG. 2 in the configuration of the input resolution identifying unit. The input resolution identifying unit 70 here comprises a counter 72, a comparator 74, a counter 76, a register 78, and a comparator 80.

Figure 6A:
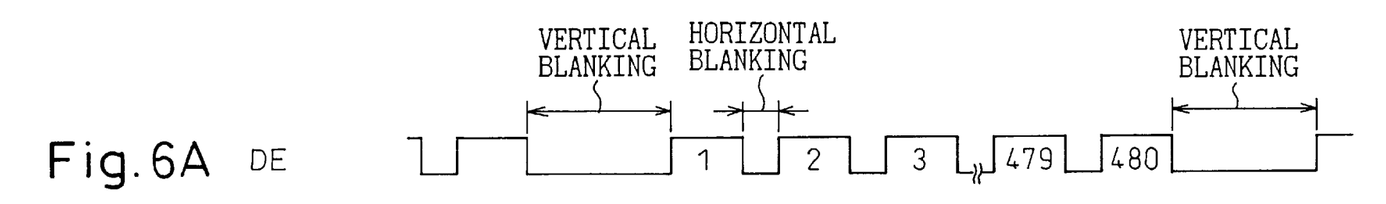
FIGS. 6A, 6B, 6C, 6D, 6E, and 6F are a timing chart for explaining the operation of an input resolution identifying unit shown in FIG. 5.
Figure 6B:
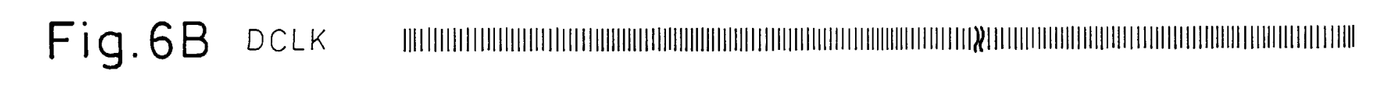

The operation of the input resolution identifying unit 70 will be described with reference to the timing chart of FIGS. 6A to 6F. As shown in FIG. 6A, the number of pulses of the DE signal generated within one vertical synchronization period, a period between one vertical blanking period to the next vertical blanking period, is uniquely determined by the resolution mode, that is, 480 for VGA mode, 600 for SVGA mode, 768 for XGA mode, and 1024 for SXGA mode. Accordingly, the resolution of the input video signal can be identified by obtaining the number of pulses of the DE signal during one vertical synchronization period.

To detect one vertical synchronization period, the vertical blanking period must also be detected; in the present invention, the vertical blanking period is detected based on the number of clocks of the DCLK signal generated during an inactive period of the DE signal. That is, as previously noted, the number of clocks of the DCLK signal generated during an active period of the DE signal is 640 for the VGA mode which is the lowest resolution mode. The horizontal blanking period is shorter than the active period of the DE signal, and the number of clocks of the DCLK signal generated during the horizontal blanking period is, in the case of the VGA mode, smaller than 640. Further, the vertical blanking period is longer than the combined period (horizontal synchronization period) of the active period of the DE signal and the horizontal blanking period. In view of this, when the number of clocks of the DCLK signal generated during an inactive period of the DE signal exceeds, for example, 700, then that period can be judged to be the vertical blanking period.

Figure 6C:
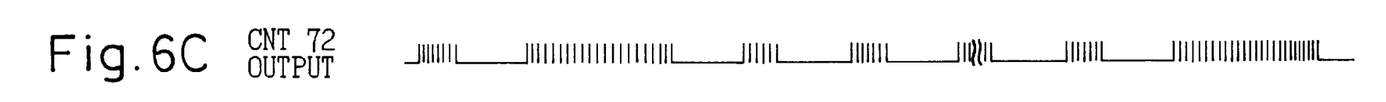
Figure 6D:
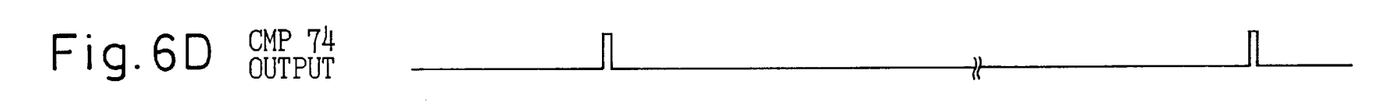

The counter 72 in FIG. 5 accepts the complement of the DE signal (FIG. 6A) at its enable terminal, the DE signal at its reset terminal, and the DCLK signal (FIG. 6B) at its clock terminal, and thus counts the DCLK signal during each inactive period of the DE signal, as shown in FIG. 6C. The comparator 74 sets its output active when the output of the counter 72 matches 700, as shown in FIG. 6D.

Figures 6E, 6F:
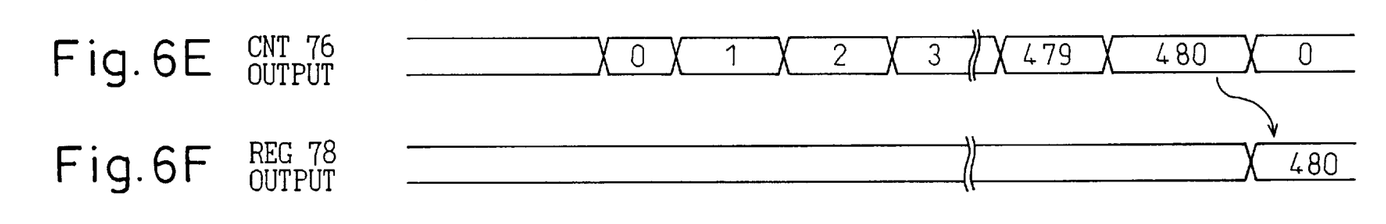

The counter 76 accepts the DE signal at its clock terminal and the output of the comparator 74 at its reset terminal, so that the output of the counter 76 changes as shown in FIG. 6E, thus counting the number of pulses of the DE signal during one vertical synchronization period. When the output of the comparator 74 goes active, the output of the counter 76 is latched into the register 78; thus, the output of the register 78 represents the number of pulses of the DE signal generated during one vertical synchronization period, as shown in FIG. 6F. The remainder of operation from the comparator 80 onward is the same as the operation from the comparator 36 onward in FIG. 2, except that the reference values in the comparator 80 are different from those in the comparator 36.

As described above, according to the present invention, the input digital video signal can be converted to a signal having a resolution that matches a display device by using simple hardware of the size capable of being integrated together with the pixel density converter, and by eliminating the need to develop firmware.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of converting a resolution of a digital video signal that is input together with a data enable signal and a dot clock signal, comprising:

identifying one vertical synchronization period based on number of clocks of the dot clock signal generated during an inactive period of the data enable signal;

counting number of pulses of the data enable signal generated during the one vertical synchronization period;

identifying the resolution of the input video signal based on the counted number of pulses; and converting, based on the identified resolution, a pixel density of the input video signal so as to form a video signal having a resolution matching a display device.

2. An apparatus converting a resolution of a digital video signal that is input together with a data enable signal and a dot clock signal, comprising:

means for identifying one vertical synchronization period based on number of clocks of the dot clock signal generated during an inactive period of the data enable signal;

count means for counting number of pluses of the data enable signal generated during the one vertical synchronization period;

identifying means for identifying the resolution of the input video signal based on the counted number of pulses; and pixel density converting means for converting, based on the identified resolution, a pixel density of the input video signal so as to form a video signal having a resolution matching a display device.

* * * * *